US008588698B2

(12) United States Patent
Brisebois et al.

(10) Patent No.: US 8,588,698 B2
(45) Date of Patent: Nov. 19, 2013

(54) BLUETOOTH-ENABLED FEMTO PILOT GATING

(75) Inventors: Arthur Richard Brisebois, Cumming, GA (US); Mark Causey, Tucker, GA (US); Adrianne Luu, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 569 days.

(21) Appl. No.: 12/869,228

(22) Filed: Aug. 26, 2010

(65) Prior Publication Data

US 2012/0052793 A1 Mar. 1, 2012

(51) Int. Cl.
*H04B 1/00* (2006.01)
(52) U.S. Cl.
USPC .................................. 455/63.1; 455/67.13
(58) Field of Classification Search
USPC ........... 455/435.2, 436–444, 574, 63.1, 67.13
See application file for complete search history.

(56) References Cited

U.S. PATENT DOCUMENTS

| 7,613,425 | B2* | 11/2009 | Tailor | 455/41.2 |
| 8,320,965 | B2* | 11/2012 | Kwun et al. | 455/561 |
| 2008/0134281 | A1* | 6/2008 | Shinde et al. | 726/1 |
| 2009/0042593 | A1* | 2/2009 | Yavuz et al. | 455/522 |
| 2011/0263258 | A1* | 10/2011 | Soliman et al. | 455/436 |

* cited by examiner

*Primary Examiner* — Raymond Dean
(74) *Attorney, Agent, or Firm* — Turocy & Watson, LLP

(57) ABSTRACT

A low-cost and power-saving system and methodology that reduces interference, unnecessary signaling and allows for more pertinent network listen measurements, by employing Bluetooth® technology in a femto access point (FAP) is provided. Moreover, a cellular transmitter in the FAP remains deactivated and is activated only if a UE, authorized for femtocell access, is within the femtocell coverage area. Bluetooth pairing is employed to identify authorized UEs within the femtocell coverage area. In an aspect, the FAP includes a Bluetooth modem that broadcasts a unique Bluetooth identity (ID) and facilitates Bluetooth pairing with nearby UEs. During the interval when the cellular transmitter is deactivated, the FAP performs background activities (e.g., network listen scanning and/or femto jamming of macro pilot). Additionally, a Bluetooth repeater is embedded within the FAP that extends the range of a Bluetooth-enabled device to the femtocell coverage area.

20 Claims, 13 Drawing Sheets

BLUETOOTH-ENABLED FEMTO PILOT GATING

CROSS-REFERENCE TO RELATED APPLICATIONS

The subject application is related to co-pending U.S. patent application Ser. No. 12/857,133, entitled "BLUETOOTH-ENABLED FEMTO ACCESS CONTROL," and filed on Aug. 16, 2010. The entirety of this application is incorporated herein by reference.

TECHNICAL FIELD

The subject disclosure relates to wireless communications and, more particularly, to a mechanism, which provides Bluetooth-enabled femto pilot gating that facilitates selective access point (AP) transmitter activation to reduce interference, unnecessary signaling and allow for more pertinent network listen measurements.

BACKGROUND

Femtocells—building-based wireless access points interfaced with a wired broadband network—are traditionally deployed to improve indoor wireless coverage, and to offload traffic from a mobility radio access network (RAN) operated by a wireless service provider. Improved indoor coverage includes stronger signal, increased bandwidth, and improved reception (e.g., video, sound, or data), ease of session or call initiation, and session or call retention, as well. Offloading traffic from a RAN reduces operational and transport costs for the service provider since a lesser number of end users consumes macro RAN over-the-air radio resources (e.g., radio traffic channels), which are typically limited. With the rapid increase in utilization of communications networks and/or devices, mobile data communications have been continually evolving due to increasing requirements of workforce mobility, and, services provided by femtocells can be extended beyond indoor coverage enhancement.

Typically, femto access points (FAPs) include a Universal Mobile Telecommunications System (UMTS) transmitter for communication with user equipment (UE) within the femtocell coverage area. Traditionally, the femto UMTS transmitter is always on. Always-on femto UMTS transmitters create continuous downlink interference and attract unnecessary Location/Routing area and handover traffic from nearby unauthorized UEs. This interference and signaling can degrade the performance and battery life of the nearby UEs and network elements involved in the signaling flow. Further, traditional femto access control and incoming handovers are signaling-intensive, and limited in the number of unique access point (AP) identifiers available. Upon discovery of new AP, the UE performs extensive signaling activity with many network elements before access is accepted or denied. Especially in the cases where the access is denied (e.g., unauthorized UE), the extensive signaling activity provides substantial amount of overhead.

Further, when femto transmitters are always on, the FAP is unable to utilize scan receiver measurements during periods when the macro network is busiest. Instead, conventional FAPs turns off their UMTS transmitters for a short time at night in order to collect scan receiver measurements. These late night measurements are optimistic because the macro network is not under load. However, femto channel selection decisions based upon these optimistic measurements can cause performance issues at a later time, when the macro network is under load or is busy.

SUMMARY

The following presents a simplified summary of the specification in order to provide a basic understanding of some aspects of the specification. This summary is not an extensive overview of the specification. It is intended to neither identify key or critical elements of the specification nor delineate any scope particular embodiments of the specification, or any scope of the claims. Its sole purpose is to present some concepts of the specification in a simplified form as a prelude to the more detailed description that is presented later.

The systems and methods disclosed herein, in one aspect thereof, can facilitate selective femto access point (FAP) transmitter activation to save power, reduce interference and unnecessary signaling, and allow for more pertinent network listen measurements. In an aspect, the system includes a Bluetooth modem, with a unique identifier, embedded within or operatively connected to the FAP. The Bluetooth modem employs standard Bluetooth pairing procedures to identify presence and/or proximity of user equipments (UEs) that are authorized to access the femtocell. Only on identification of one or more authorized UEs, is the FAP transmitter activated. In particular, the FAP transmitter remains off until the Bluetooth modem has paired with an authorized device and during this interval, the FAP performs background activities. Once Bluetooth pairing is complete, the FAP switches on the FAP transmitter on and the nearby authorized UE can complete the attach procedure to camp onto the femtocell.

Another aspect of the disclosed subject matter relates to a method that can be employed to facilitate Bluetooth-enabled femto pilot gating. The method comprises deactivating a cellular transmitter in the FAP, for example, a Universal Mobile Telecommunications System (UMTS) transmitter and employing a Bluetooth transmitter, operatively connected to the FAP, to facilitate Bluetooth pairing with a UE within the Bluetooth range. Further, the method includes activating the cellular transmitter only if the Bluetooth pairing is successful. Once the cellular transmitter is activated, the authorized UE can detect the femto pilot, perform attachment signaling, and communicate via the FAP. Further, the FAP can monitor presence of authorized UEs within the femtocell coverage area (e.g., by employing Bluetooth communication) and identify whether at least one authorized UE is within the femtocell coverage area. If authorized UEs are not present within the femtocell coverage area, the cellular transmitter can be deactivated.

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

DETAILED DESCRIPTION

Figure 1:
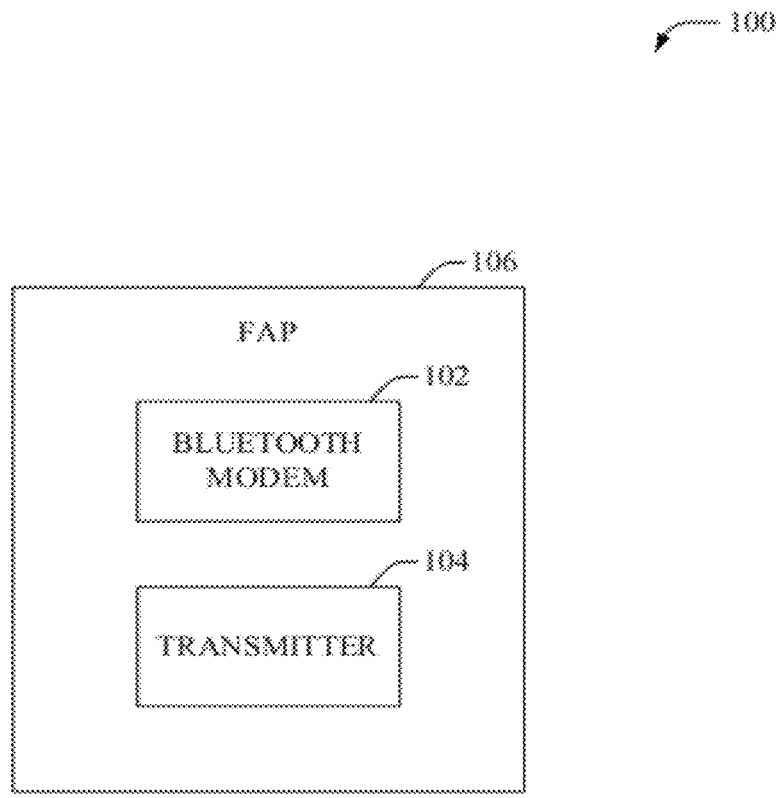
FIG. 1 illustrates an example system that can provide Bluetooth-enabled femto pilot gating in a femto network.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "client," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. Additionally, the terms "femtocell", and "femto" are utilized interchangeably, while "macro cell" and "macro" are utilized interchangeably herein.

Further, the terms "user," "subscriber," "customer," and the like are employed interchangeably throughout the subject specification, unless context warrants particular distinction(s) among the terms. It should be appreciated that the aforementioned terms can refer to human entities or automated components supported through artificial intelligence (e.g., a capacity to make inference based on complex mathematical formalisms), which can provide simulated vision, sound recognition and so forth. In addition, the term friend, as disclosed herein refers to an entity, such as, but not limited to, a human entity, an automated component, and/or a user equipment associated with the human entity and/or automated component.

Conventional femto systems employ continuously-on transmitters (e.g., Universal Mobile Telecommunications System (UMTS) transmitters) for communication with user equipment (UE). The continuously-on femto transmitters can create substantial downlink interference and perform unnecessary attachment signaling, including, a Location Area Update (LAU) and/or Routing Area Update (RAU) with each user equipment (UE) that attempts to connect to the femto network. Typically, in conventional systems, the attachment signaling is performed prior to detecting whether a UE is authorized to camp on the femto network. Moreover, when a UE is denied access to the femto network, the extensive attachment signaling unnecessarily degrades the performance and battery life of the UE and network elements involved in the signaling flow. Aspects disclosed herein relate to Bluetooth-based femto pilot gating that utilizes standard Bluetooth pairing procedures to identify UE/femto presence and proximity to each other before activating femto transmitters. The selective femto transmitter activation disclosed herein reduces interference, unnecessary signaling and allows for more pertinent network listen measurements.

It can be appreciated that aspects, features, or advantages of the subject innovation can be exploited in substantially any wireless communication technology; e.g., Universal Mobile Telecommunications System (UMTS), Global System for Mobile Communications (GSM), Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that can provide Bluetooth-enabled femto pilot gating, according to an aspect of the subject innovation. System 100 provides a Bluetooth modem 102 within a femto access point (FAP) 106 that facilitates selective activation of a cellular technology transmitter 104. According to an embodiment, a femtocell can be served by the FAP 106 that manages femto access. As an example, the FAP 106 can be deployed in most any location, such as, but not limited to, a home, a workshop, an office, an airport, a library, a hospital, a retail store, salon, grocery store, etc. Typically, the FAP 106 can communicate with a UE (not shown), within a femtocell coverage area, and grant/deny femto access to the UE. In one aspect, the UE can include a Bluetooth client that facilitates idle mode reselection and/or active mode handover behavior by employing Bluetooth® technology, as explained infra. Bluetooth® technology provides a method to connect and exchange information between devices via a secure, globally unlicensed short-range radio frequency.

In one aspect, FAP 106 includes the Bluetooth modem 102, which can facilitate Bluetooth pairing with a UE, before the transmitter 104 is activated. Pairing, as disclosed herein, is a process by which two or more devices (e.g., UE and FAP 106) associate themselves with one another to create a Bluetooth® type connection. Typically, the two devices can employ a shared password/code that can be employed for future communication between the devices. After pairing, connections between the two devices are authenticated automatically. Further, the transmitter 104 within FAP 106 can include most any cellular technology transmitter, such as, but not limited to, a UMTS transmitter. According to an aspect, the transmitter 104 is turned off when the FAP 106, is not serving traffic. If an authorized UE enters the femto coverage area, the transmitter 104 is turned on. Accordingly, interference caused by the transmit signal for surrounding macro cells and/or femtocells in the environment around the FAP 106 is significantly reduced.

In accordance with an aspect, the Bluetooth modem 102 can comprise a unique identifier, such as, but not limited to, an address or location of the FAP 106, FAP owner's name, etc. The unique identifier associated with the FAP 106 can be provided to a UE that is authorized to communicate over the femto network (e.g., during setup or at most any other time). Thus, when an authorized UE enters the Bluetooth range of the Bluetooth modem 102, Bluetooth pairing can be performed between the Bluetooth client of the UE and the Bluetooth modem 102. If the pairing is successful, the FAP 106 can turn on the transmitter 104. Accordingly, the UE can then detect the cellular technology signal, e.g., femto pilot, and attach to the FAP 106.

Figure 2:
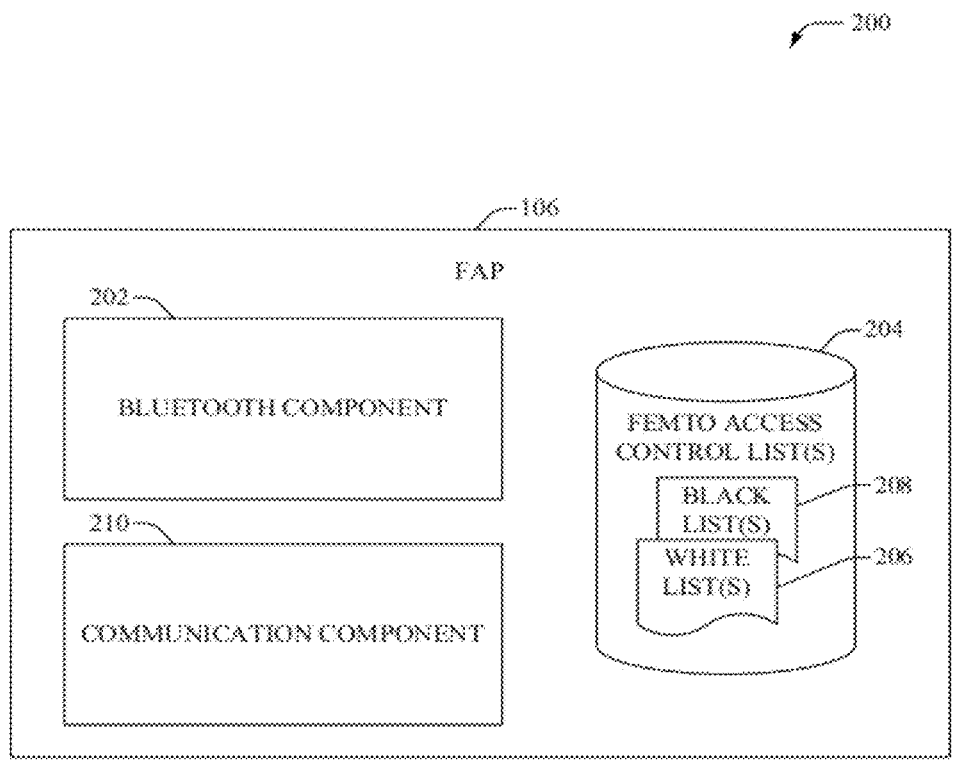
FIG. 2 illustrates an example system that can be employed for controlling access to a femtocell by employing Bluetooth® technology.

Referring to FIG. 2, there illustrated is an example system 200 that can be employed for controlling access to a femtocell by employing Bluetooth® technology in accordance with an aspect of the subject disclosure. In one embodiment, a Bluetooth component 202 can be utilized by the FAP 106 to facilitate femto access control. Typically, the Bluetooth component 202 can reside within the FAP 106 (as shown in FIG. 2), and/or be operatively coupled to the FAP 106. It can be appreciated that the FAP 106 can include functionality, as more fully described herein, for example, with regard to system 100. Moreover, a cellular transmitter (e.g., within communication component 210) can be switched off when idle. Thus, without a pilot to detect, a nearby-unauthorized UE will not attempt to attach or hand to the FAP unnecessarily and thus unnecessary attachment signaling will be reduced. On the other hand, authorized UEs will detect the Bluetooth signal transmitted by a Bluetooth modem (e.g., within Bluetooth component 202) and complete Bluetooth pairing with the Bluetooth modem, which in turn will trigger activation of the cellular transmitter. Once the cellular transmitter is activated, the authorized UEs can facilitate attachment procedures to connect to the FAP 106.

In one aspect, the Bluetooth modem for example within the Bluetooth component 202 can include a unique identifier. For example, the unique identifier can be 8-128 bits long and/or can include FAP address, homeowner name, name of location where the FAP is deployed, etc. In one aspect, the identifier can be utilized as a password to establish Bluetooth communication with a UE. Typically, Bluetooth communication employs frequency-hopping spread spectrum, which transmits data on up to 79 bands of 1 MHz width in the range 2402-2480 MHz. Moreover, this frequency range in the globally unlicensed Industrial, Scientific and Medical (ISM) 2.4 GHz short-range radio frequency band, and thus does not cause interference in cellular communication in surrounding macro and/or femto cells. In general, the Bluetooth communication utilizes a packet-based protocol with a master-slave structure. For example, the FAP 106 can be a master and can communicate with up to seven slaves (e.g., UEs) in a piconet. Further, the Bluetooth communication provides a secure way to connect and exchange information between the FAP 106 and a UE. Bluetooth® specifications are developed by the Bluetooth Special Interest Group (SIG), for example, Bluetooth Core Specification Version 3.0+HS, and Bluetooth Core Specification Version 4.0, which are incorporated by reference herein.

Referring back to FIG. 2, the FAP 106 can include an access control list 204 (e.g., white lists 206, black lists 208, etc.), that can be employed to provide access to femto cell service. Such access control list 204 can be configured through various apparatuses and in various modes, e.g., interactively or automatically, which facilitate access management of access to femto cell coverage. White list(s) 206 can include a set of subscriber station(s) identifier numbers, codes or tokens, and can also include additional fields that can contain information respectively associated with communication devices to facilitate femto cell access management based at least in part on desired complexity; for instance, an additional field in a white list can be a logic parameter that determines whether an associated identifier is available for dissemination across disparate white lists. Black list(s) 208 can include a single attribute field, which uniquely identifies a mobile device; the identified device is denied femto access service. Values of attribute fields that determine white list(s) 206 or black list(s) 208 can be generated through various sources, for example, automatically or based on user input.

Typically, the access control list 204 can be most any relational database table that includes a set of one or more fields for each attribute in the tables. It is noted, however, that other table models (e.g., hierarchical, object oriented) can be employed to define the friends list. Moreover, the access control list 204 can include N entries, wherein N can be most any natural number from 1 to infinity. According to an aspect, information from the access control list 204 can be utilized to determine UEs that are authorized to communicate via the femtocell and to which the Bluetooth password can be communicated for Bluetooth pairing (e.g., by the Bluetooth component 202). According to an aspect, a user (e.g., femtocell owner, authorized user, etc.), when added to the FAP whitelist 206, can complete a Bluetooth registration (including the password), for example, from their UE towards the specific FAP Bluetooth modem.

Further, it can be appreciated that the femto access control list 204 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

According to an aspect, a communication component 210 can control the switching (on and/or off) of the cellular transceiver in the FAP 106, for example, a UMTS transceiver. Typically, the communication component 210 can switch off the cellular transceiver until the Bluetooth component 202 indicates successful pairing with an authorized device. In one example, during the off interval, the FAP 106 can perform background activities like network listen scanning and/or femto jamming of macro pilot. Once Bluetooth pairing is complete, the communication component 210 can turn on the cellular transmitter, such that nearby authorized UEs can detect the FAP 106 and can complete the attach procedure. As an example, the AP communication component 210 can also determine when the last paired UE has left the femtocell coverage area and accordingly turn off the cellular transceiver when all authorized UEs have left the femtocell.

Figure 3:
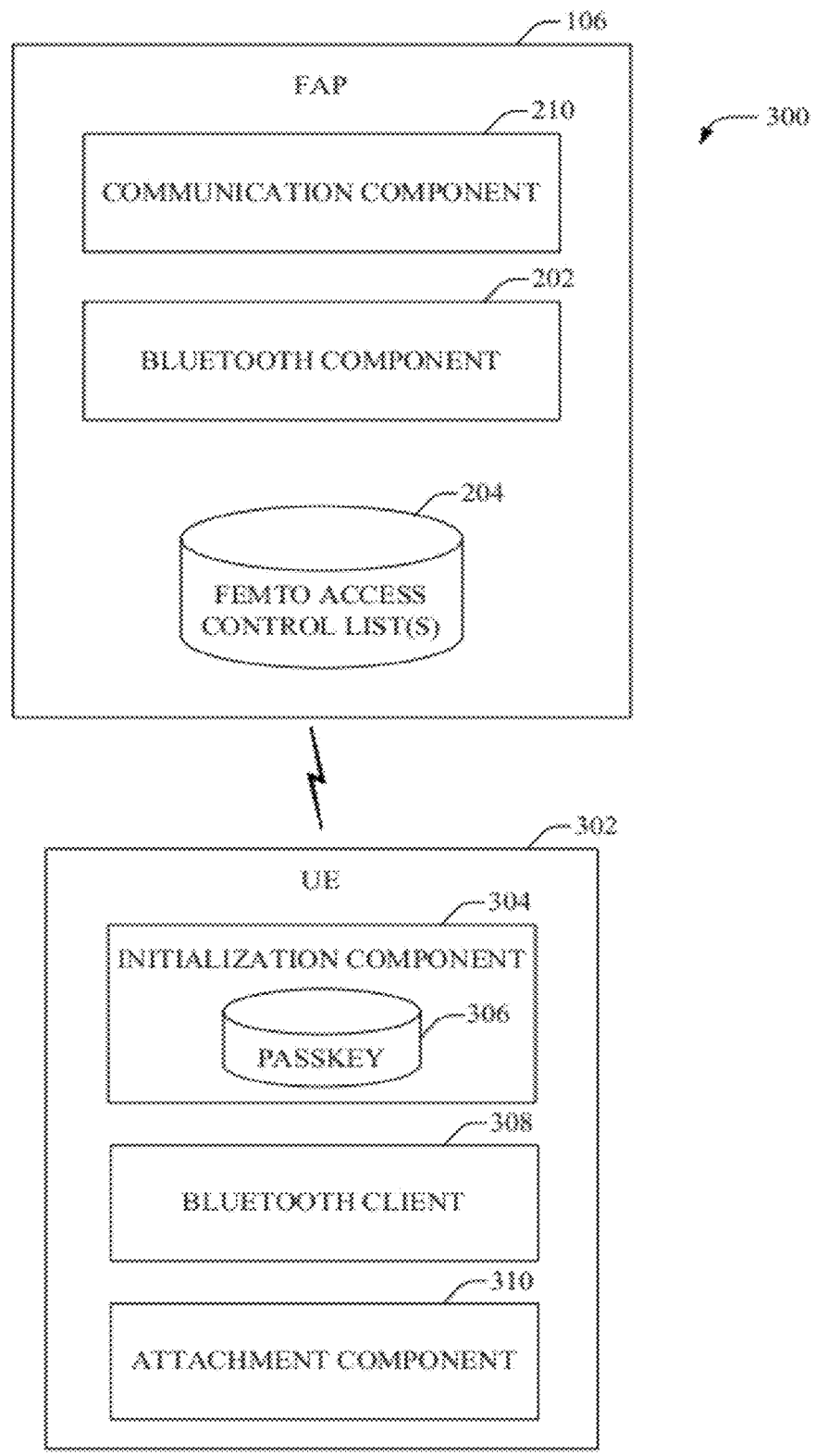
FIG. 3 illustrates an example system that employs Bluetooth communication to identify user equipment (UE) presence and/or proximity prior to activating femto transmitters.

FIG. 3 illustrates an example system 300 that employs Bluetooth communication to identify UE presence and/or proximity prior to activating femto transmitters, according to an aspect of the subject disclosure. It can be appreciated that the FAP 106, Bluetooth component 202, femto access control list 204 and communication component 210 can include functionality, as more fully described herein, for example, with regard to system 100 and 200. Typically, the UE 302 can include most any electronic device, such as, but not limited to, media players, digital cameras, media recorders, laptops, cell phone, PDAs (personal digital assistants), personal computers, printers, scanners, digital photo frames, GPS module, gaming module, etc. Further, the UE 302 can also include most any LTE-based appliances that can employed, for example, in a home, office, building, retail store, restaurant, hotel, factory, warehouse, etc., such as, but not limited to, heating or cooling unit, lighting unit, washing machine, dryer, dishwasher, refrigerator, oven, stove, etc. It can be appreciated that the UE 302 can be mobile (e.g., cellular phone), have limited mobility (e.g., desktop computer) and/or be stationary (e.g., air conditioning unit).

In one aspect, femto access control list 204 includes information associated with UEs that can be allowed or denied femto access. Typically, such information can be input by a femtocell owner and/or authorized user, or automatically determined. For UEs added to the femto access control list 204, such as, UE 302, the UE user can perform a Bluetooth registration (via the initialization component 304) from the UE 302 towards the specific FAP Bluetooth modem, within the Bluetooth component 202. Typically, registration can be performed at most any time, such as, but not limited to periodically, dynamically, during setup, etc. During registration, the initialization component 304 can receive and store a passkey 306 from the FAP 106 and/or via user input. In one aspect, the passkey 306 can include most any secret code that can enable Bluetooth pairing between the FAP 106 and the UE 302. For example, the passkey 306 can include a unique identifier (e.g., indicative of the FAP address/location, owner's name, etc.) associated with the Bluetooth component 202.

Further, the UE 302 can include a Bluetooth client 308 that can activate a Bluetooth receiver of a Bluetooth modem (e.g., within Bluetooth client 308), which can scan for a registered Bluetooth transmitter. Moreover, the Bluetooth signals transmitted by the Bluetooth component 202 in the FAP 106 can be received by the UE 302 (e.g., by the Bluetooth receiver). Furthermore, the Bluetooth client 308 can utilize the passkey 306 to facilitate Bluetooth pairing with the Bluetooth component 202. It can be appreciated that the subject disclosure is not limited to utilization of passkeys for Bluetooth pairing and most any pairing mechanism can be employed.

On detecting that Bluetooth pairing is successful, the communication component 210 can turn on a cellular transceiver of the FAP 106, which can transmit a femto pilot signal. For example, the cellular transmitter can transmit a specific LAC (location area code) range, which can be pre-programmed as "FEMTO" in the UE 302. When the UE 302 detects a cell with a LAC within the FEMTO LAC range, an attachment component 310 can be employed by the UE 302 to complete a Location Area Update (LAU) and/or Routing Area Update (RAU) and attach to the FAP 106 using standard signaling. However, in an example scenario, wherein a UE (not shown) within the femtocell range, is not authorized for femtocell access, an appropriate Bluetooth identifier (e.g., passkey 306) is not found and the Bluetooth pairing is unsuccessful. In this scenario, the cellular transceiver in the FAP 106 will remain switched off, the unauthorized UE will not detect the FAP 106 and thus, will not attempt to perform unnecessary attachment signaling. In an another example, when the cellular transceiver is on, a new UE (not shown) trying to attach to the FAP 106, can determine, by employing Bluetooth pairing, whether access to the femto network will be granted, prior to performing attachment signaling. In this scenario, the UE will perform attachment signaling only if Bluetooth pairing is successful.

Figure 4A:
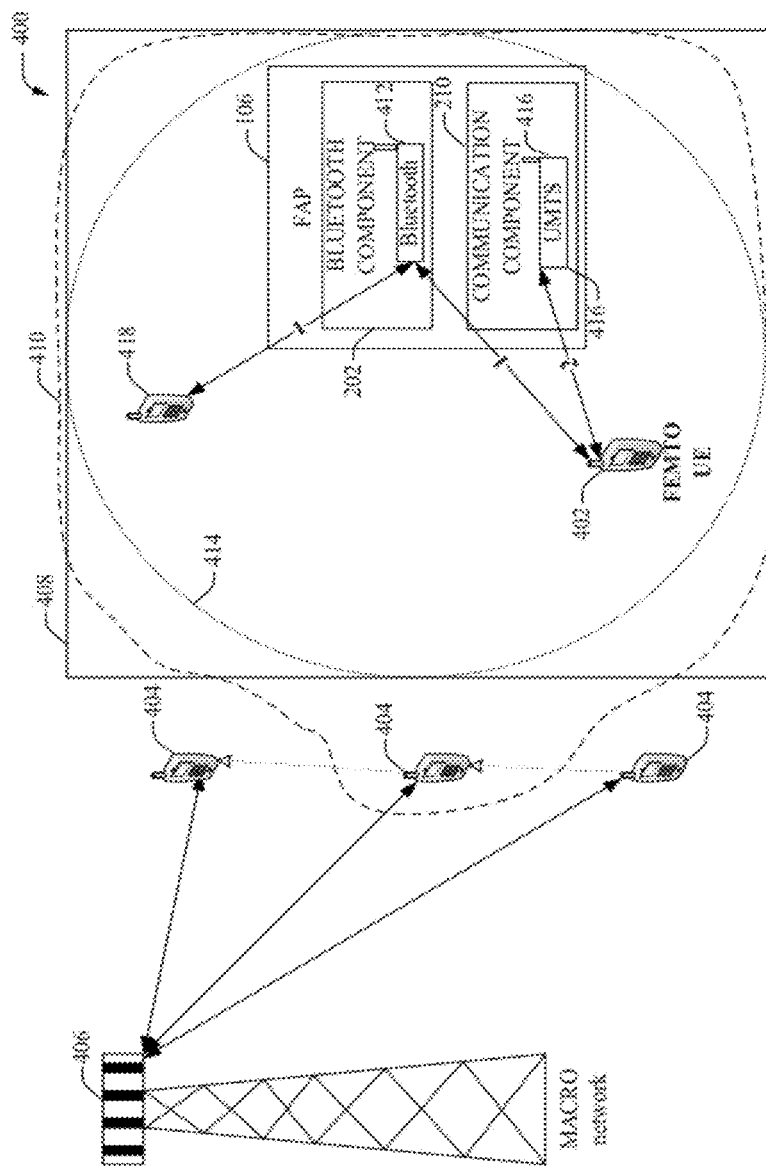
FIG. 4A illustrates an example system for reducing interference by employing selective femto access point (FAP) transmitter activation.

FIG. 4A illustrates an example system 400 for reducing interference by employing selective FAP transmitter activation, according to an aspect of the subject specification. It can be appreciated that the FAP 106, Bluetooth component 202, and communication component 210 can include functionality, as more fully described herein, for example, with regard to system 100, 200, and 300. Further, UE 402 can be substantially similar to UE 302 and can include functionality, as more fully described herein with respect to UE 302, in system 300.

According to an embodiment, FAP 106 is deployed within an area, for example, a home 408. The femtocell coverage area 410 can be determined, at least in part, by transmission power allocated to FAP 106, path loss, shadowing, and so forth. Coverage area 410 typically can be spanned by a coverage radius that ranges, for example, from 20 to 50 meters. The coverage area 410 is generally associated with an indoors area, or a building, which can span about 5000 sq. ft. In one aspect, FAP 106 can include a Bluetooth component 202, which comprises a Bluetooth modem 412. The Bluetooth modem 412 can perform pairing with UEs within the Bluetooth range 414. As an example, the Bluetooth range can be adjusted to overlap the femto coverage area 410 and/or the area of the home 408.

According to an embodiment, communication component 210 can initially turn off the UMTS transmitter 416 to reduce cellular interference with macro cell (e.g., served by base station 406) and/or surrounding femtocells (not shown). Moreover, the communication component 210 can turn on the UMTS transmitter 416 only if a subscriber that is authorized to utilize the femtocell, is present within the femtocell coverage area. In one aspect, the Bluetooth component 412 facilitates identification of authorized UEs within the femtocell coverage area. In an example scenario, wherein an authorized UE, for example UE 402, enters Bluetooth range 414, the UE 402 can initially perform Bluetooth pairing (1) with the Bluetooth modem 412. In particular, the UE 402 can activate a Bluetooth receiver and scan for a registered Bluetooth transmitter. Since, the UE 402 is authorized for femto access (e.g., information associated with the UE 402 is stored within a white list in the FAP 106), the Bluetooth pairing can be successfully performed. On determining that Bluetooth pairing was successful, the communication component 210 can turn on the UMTS transmitter 416. Moreover, UE 402 can then detect a LAC transmitted by the UMTS transmitter 416 and can then complete attachment signaling (e.g., LAU/RAU) (2) with the UMTS transmitter 416 and attach to the FAP 106. Although the FAP 106 in system 400 employs a UMTS transmitter, it can be appreciated the subject disclosure is not so limited and most any communication technology can be employed for femtocell communication.

In another example scenario, consider an unauthorized UE, for example UE 404, that is passing by the home 408 (e.g., walking on a road outside the home 408, driving by on a road outside the home 408, etc.) Although illustrated as outside the home 408, it can be appreciated that the unauthorized UE 404 can also be located within the home 408. Moreover, UE 404 can be connected to a macro network via base station 406. Traditionally, when UE 404 enters the femtocell coverage area 410, the UE 404 would perform attachment signaling to attach to the FAP 106 and after the attachment signaling has been completed, the FAP 106 would deny access to the unauthorized UE 404. However, in one aspect of the subject specification, the UMTS transmitter 416 is switched off (e.g., when authorized UEs are not present within the femtocell coverage area 410). Thus, the unauthorized UE 404 does not detect a femto pilot from the UMTS transmitter 416 and thus does not waste resources to perform an attachment procedure. Additionally, the quality of voice calls made by the UE 404, with the macro network is not affected.

In yet another example, if the unauthorized UE is inside the house 408, for example UE 418, the Bluetooth client within UE 418 can attempt Bluetooth pairing (1) with Bluetooth modem 412. Since the UE 418 is unauthorized to camp on the femtocell 106, the Bluetooth pairing will be unsuccessful and the UMTS transmitter 416 will remain turned off. Moreover, since Bluetooth® employs an unlicensed spectrum, interference with other femto/macro networks is not caused by the Bluetooth signaling.

In an additional and/or optional example, when the UMTS transmitter 416 is turned on, for example, due to the presence of authorized UE 402 within the femtocell coverage area 410, most any disparate UE that enters the femtocell coverage area 410 can initially activate a Bluetooth receiver of the UE, prior to initiating attachment signaling. In one aspect, the Bluetooth pairing can be employed by the disparate UE to identify whether the disparate UE is authorized to camp on a detected femtocell prior to initiating attachment signaling. System 400 enables the disparate UE to recognize whether a femtocell is a viable candidate for communication (e.g., by employing Bluetooth communication) and attempt to attach to the femtocell based on the recognition. For example, the disparate UE can perform Bluetooth pairing with the Bluetooth modem 412, before attempting to attach to the FAP 106. Moreover, only if the Bluetooth pairing is completed successfully, the disparate UE performs attachment signaling. Alternately, if Bluetooth pairing is not completed, the disparate UE ignores the femtocell and does not perform attachment signaling.

Figure 4B:
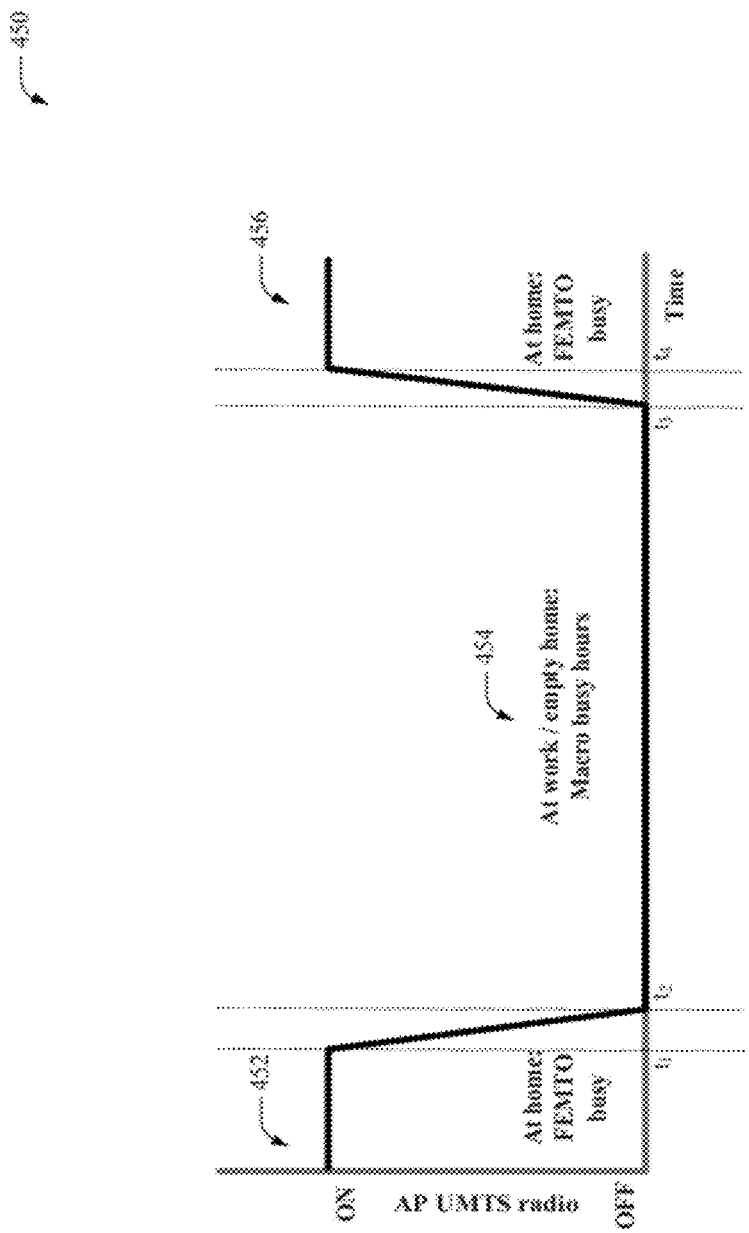
FIG. 4B illustrates an example duty cycle of a cellular transmitter within a FAP in accordance with an aspect of the subject specification.

Referring now to FIG. 4B, there illustrated is an example duty cycle 450 of the UMTS transmitter (e.g., 416) within the FAP (e.g., 106). It can be appreciated that although this example scenario relates to a UMTS transmitter in FAP deployed within a home, the subject specification is not so limited and the FAP can be deployed in most any area, such as, but not limited to, an office, a store, a hotel, an apartment, a salon, a factory, etc. As seen from the figure, the UMTS transmitter can be ON (452, 456) and OFF (454) at various times in day. In this example, wherein the FAP is deployed in a home, the UMTS transmitter can be switched ON, when at least one authorized UE is within the home and can be switched OFF during the time that authorized UEs are not present within the home (e.g., the subscriber/authorized users are not at home, gone to work/vacation, etc.).

In one aspect, the communication component (e.g., 210) can adjust the duty cycle 450 of the UMTS transmitter and switch on the transmitter, only if an authorized UE is within the femtocell coverage area. For example, the UMTS transmitter can be switched OFF at 8:00 AM ($t_1$-$t_2$) on a weekday, when determined that the authorized users have left the house (e.g., gone to work, school, etc.). Accordingly, UMTS transmitter can remain switched OFF during the day (454), for example, when the authorized users are not at home. In one aspect, the FAP can collect scan receiver measurements, during the time that the UMTS transmitter is switched OFF (454). Typically, at this time (454), the macro network is busiest and accurate femto channel selection decisions can be made based upon these measurements. In addition, as soon as an authorized UE enters the femtocell the UMTS transmitter can be turned ON ($t_3$-$t_4$) and can remain ON (456) until at least one authorized UE is within the femtocell coverage area and/or employing/connected to the femto network.

In one aspect, when the UMTS transmitter is activated at $t_3$ (or deactivated at $t_1$), the UMTS power transmitted can add interference for other non-whitelisted UE (e.g., 418, 404) nearby. Typically, the UE can detect a reduction in Ec/Io (the ratio of received pilot energy, Ec, to total received energy or the total power spectral density, Io) and scan for other cleaner UMTS carriers. However, if the UMTS transmitter turns from off to full power all at once (not shown) or vice versa, it may cause loss of synch and temporary no-service condition for the nearby UE, which cannot scan and reselect fast enough to get away from the interference. Thus, according to one embodiment, the UMTS transmitter can turn ON ($t_3$) and gradually ramp up power from low to high (or optimal setting), e.g., $t_3$-$t_4$, when nearby UE complete Bluetooth pairing. Typically, "gradual" can be a few seconds, or at least long enough to allow the nearby UE to detect interference, scan and reselect before being completely jammed with interference from the full-power UMTS transmitter of the FAP. Accordingly, the FAP power ramp-up ($t_3$-$t_4$) improves service stability for non-whitelisted UE (e.g., 418, 404) nearby (e.g., within the femtocell coverage area and/or in close proximity of the femtocell coverage area).

It can be appreciated that ramp values ($t_3$-$t_4$) and/or ($t_1$-$t_2$) can be predetermined, for example, by a service provider, and stored in a database accessible to the femto AP. Additionally or alternately, the ramp values can also be dynamically adjusted or modified to achieve an optimal response at the UE. Further, it can be appreciated that duty cycle 450 is one example duty cycle and that the subject innovation is not so limited. For example, if the FAP is deployed in an office, the UMTS transmitter can be switched ON during office hours (e.g., 9:00 AM-6:00 PM) and turned OFF when all authorized employees are out of the office. Furthermore, although a UMTS transmitter is disclosed herein, it can be appreciated that the subject specification is not so limited and most any communication technology can be employed by the transmitter.

Figure 5:
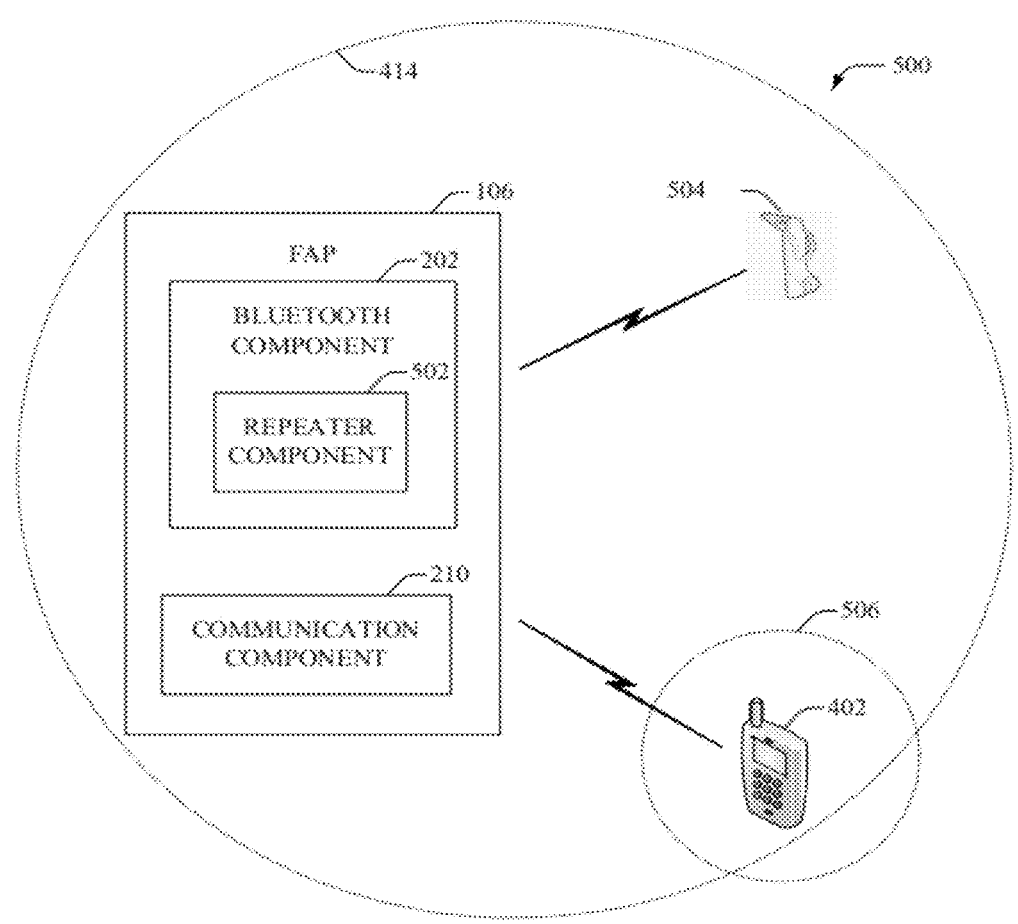
FIG. 5 illustrates an example system that employs a Bluetooth repeater in a FAP.

Referring to FIG. 5, there illustrated is an example system 500 that employs a Bluetooth repeater in a femto access point, in accordance with an aspect of the subject disclosure. It can be appreciated that the UE 402, FAP 106, Bluetooth component 202, and communication component 210 can include functionality, as more fully described herein, for example, with regard to systems 100, 200, 300 and 400. Conventional Bluetooth range 506 of a UE 402 is limited (e.g., 30 ft). Thus, to avoid dropping calls and/or interrupting communication, the Bluetooth-enabled device 504 has to remain within the Bluetooth range 506 of the UE 402. In contrast, system 500 utilizes the Bluetooth functionality embedded within the FAP 106 to expand the Bluetooth range 506 of the UE 402 and facilitate data/audio/video communication between the UE 402 and a Bluetooth-enabled device 504 (e.g., Bluetooth headset), even if the Bluetooth-enabled device 504 is moved outside the Bluetooth range 506.

In general, FAP 106 employs the communication component 210 to deactivate cellular transmitters until an authorized UE (e.g., 402) successfully completes Bluetooth pairing with the Bluetooth component 202. According to an embodiment, the FAP 106 can further employ a repeater component 502 that can receive the Bluetooth signal (data/audio/video) from the UE 402, mimic the signal, and boost it out via a Bluetooth modem within the FAP. Moreover, the signal can be received by a Bluetooth-enabled device, such as, but not limited to, a Bluetooth headset 504, within the Bluetooth range 414 of the FAP 106. As an example, the repeater component 502 can identify that the Bluetooth-enabled device 504 is likely to move/or has moved outside the Bluetooth range 506. On identification, the repeater component 502 can facilitate communication between the UE 402 and a Bluetooth-enabled device 504, by performing as a Bluetooth signal repeater.

As an example, when a user is in a phone call employing the Bluetooth headset 504 paired with the phone 402 and is within the coverage of the femtocell, the repeater component 502 can facilitate extending the range 506 of that headset to the Bluetooth coverage of the femtocell 414. Moreover, when users are within a house or structure, wherein a FAP 106 is deployed, the user can move away from the phone 402 (e.g., put the phone in a charging cradle) and continue the call on the Bluetooth headset 504. For example, the user can make and receive calls and dial via the voice dialing functionality within the phone 402. Further, system 500 can enable most any other Bluetooth-enabled devices, with most any Bluetooth range, to be configured to each other with a greater Bluetooth range. Accordingly, system 500 can allow full Bluetooth compatibility within the entire house for coverage of the femto.

Figure 6:
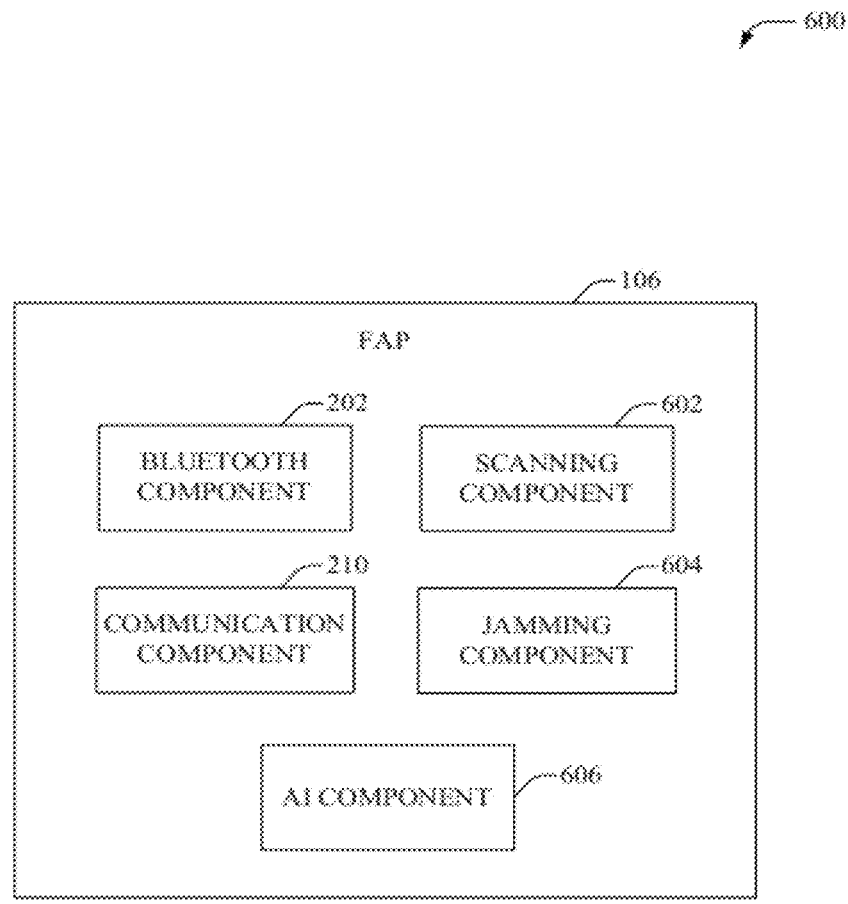
FIG. 6 illustrates an example system that facilitates Bluetooth-enabled femto pilot gating.

FIG. 6 illustrates an example system 600 that facilitates Bluetooth-enabled femto pilot gating in accordance with an aspect of the subject specification. Bluetooth-based femto pilot gating is a means to use standard Bluetooth pairing procedures to identify UE presence and/or proximity before activating cellular transmitters within the FAP 106. Moreover, the communication component 210 can deactivate FAP transmitters until an authorized UE is paired via Bluetooth communication (e.g., by Bluetooth component 202). This selective transmitter activation reduces interference, unnecessary signaling and allows for more pertinent network listen measurements. It can be appreciated that the FAP 106, Bluetooth component 202, and communication component 210 can include functionality, as more fully described herein, for example, with regard to systems 100, 200, 300 and 400.

FAP 106 can further include a scanning component 602 that can be employed to obtain scan receiver measurements. In one aspect, when the communication component 210, deactivates the cellular transmitter, the scanning component 602 can perform background activities, such as, but not limited to, network listen scanning As an example, whilst the cellular transmitter is off, most any value-added measurements can be collected by the scanning component. Additionally or alternatively, the scanning component 602 can scan the surrounding environment using network listening measurements, analyze the measurements and set the femto transmit power based on the analysis. Further, the scanning component 602 can also set the Bluetooth transmission power based on the analysis. Moreover, the Bluetooth transmission power can be adjusted to create a match, such that, the service area of the Bluetooth transmitter is the same as or close to the femtocell coverage area. Typically, the macro network can be busy when the communication component 210 deactivates the cellular transmitter and thus accurate femto channel selection decisions and/or measurements can be made.

Further, a jamming component 604 can be employed by the FAP 106 to facilitate femto jamming of macro pilot, when the cellular transmitter is deactivated. As an example, the jamming component 604 can generate a small and measured amount of interference to UE(s) camping on nearby macro carriers. Moreover, the power utilized to introduce the interference can be enough to cause macro signal quality around the FAP 106 to fall below a scan trigger level. Accordingly, the UE(s) can detect the macro signal quality decline below the scan trigger level and scan other frequency bands, including the femtocell, on which to camp. Additionally, the jamming component can scan the radio environment surrounding the FAP 106, when the cellular transmitter is in an off state, to determine information that facilitates jamming of a macro pilot. In accordance with an embodiment, nearby access points (APs), which can be collecting network listen measurements, can be made aware that FAP 106 has been assigned to a carrier, which is currently not being transmitted.

Accordingly, the nearby/surrounding APs do not mistakenly identify the carrier of FAP 106 as available for reuse.

Additionally or alternately, the FAP 106 can employ an artificial intelligence (AI) component 606, which facilitates automating one or more features in accordance with the subject innovation. The subject innovation (e.g., in connection with selective transmitter activation) can employ various AI-based schemes for carrying out various aspects thereof. For example, a process for determining when to switch on/off the cellular transmitter or how to identify an authorized UE, populating the femto access control list, performing Bluetooth pairing, can be facilitated via an automatic classifier system and process. Moreover, the classifier can be employed to determine a time period for activating and/or deactivating the cellular transmitter, a ramp up or ramp down period, a UE identity (ID) of an authorized UE, etc.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of communication systems, for example, attributes can be information stored in database 204 and/or FAP 106, and the classes can be categories or areas of interest (e.g., levels of priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing UE behavior, receiving extrinsic information). For example, SVMs are configured via a learning or training phase within a classifier constructor and feature selection module. Thus, the classifier(s) can be used to automatically learn and perform a number of functions, including but not limited to determining according to a predetermined criteria when the femtocell is likely to be idle, when a Bluetooth headset is likely to move out of a Bluetooth range of a UE in the femtocell, when authorized UEs within the femtocell are not likely to communicate, a ramp up or ramp down period when the FAP transmitter switch between ON and OFF, etc. The criteria can include, but is not limited to, historical patterns, UE behavior, user preferences, service provider preferences and/or policies, FAP parameters, location of the UE, motion of the UE, location of the femtocell, etc.

Figure 7:
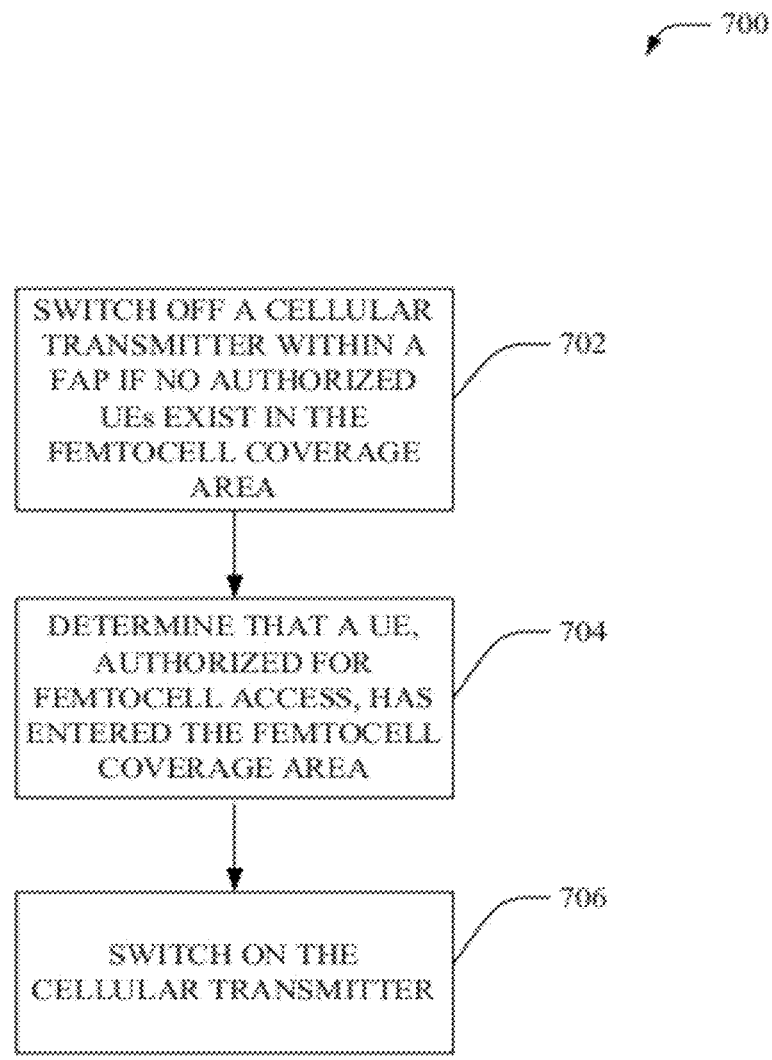
FIG. 7 illustrates an example methodology for selective activation/deactivation of cellular transmitters in a FAP.
Figure 8:
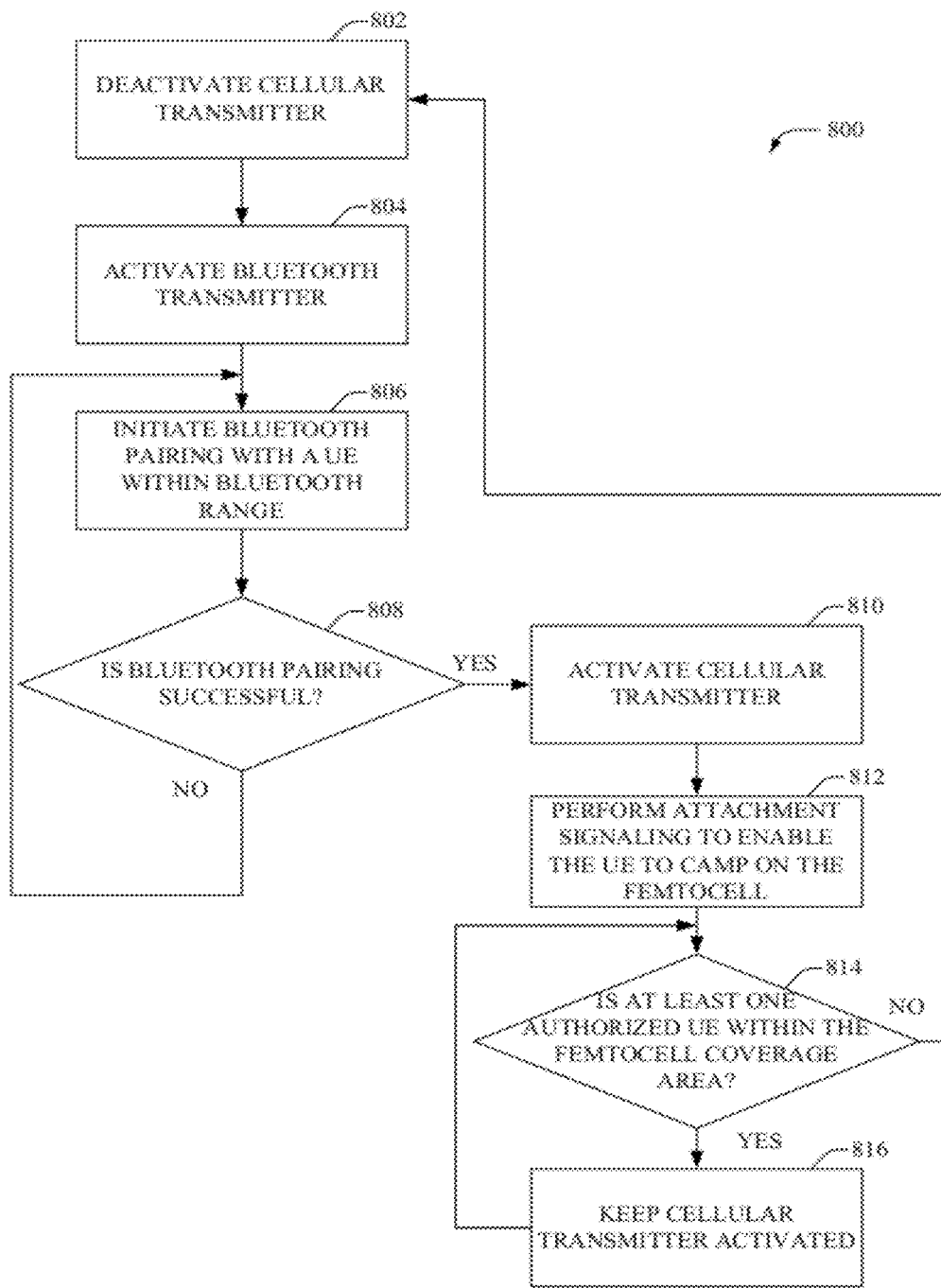
FIG. 8 illustrates an example methodology that can be utilized to provide Bluetooth-enabled femto pilot gating in a FAP.

FIGS. 7-8 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or communications/storage media.

FIG. 7 illustrates an example methodology 700 for selective deactivation of cellular transmitters in a FAP, according to an aspect of the subject specification. Specifically, methodology 700 employs Bluetooth-enabled femto pilot gating to identify UE presence and/or proximity prior to switching on a cellular transmitter (e.g., UMTS transmitter) of the FAP. Moreover, selective AP transmitter activation can reduce power consumption, interference, unnecessary signaling and allow for more pertinent network listen measurements.

In one aspect, at 702, a cellular transmitter, for example, a UMTS transmitter, within a FAP is switched off, if no authorized UEs exist in the femtocell coverage area. Typically, during this interval, the FAP can perform background activities, such as, but not limited to, network listen scanning and/or femto jamming of macro pilot. Further, at 704, it can be determined that a UE, authorized for femtocell access has entered, the femtocell coverage area. As an example, Bluetooth pairing is performed by a UE with a Bluetooth modem within the FAP. UEs that are authorized for femtocell access are typically provided with data (e.g., a passkey) that facilitates successfully completing Bluetooth pairing. Thus, based on the Bluetooth pairing, authorized and/or unauthorized UEs can be identified. In one aspect, at 706, the cellular transmitter can be switched on (e.g., when determined that the UE, authorized for femtocell access has entered, the femtocell coverage area).

Referring now to FIG. 8, illustrated is an example methodology 800 that can be utilized to provide Bluetooth-enabled femto pilot gating, according to an aspect of the subject innovation. Typically, a FAP can include or can be operatively connected to a Bluetooth modem with a unique identifier (e.g., indicative of the FAP address or FAP owner's name, unique device ID, etc.). The Bluetooth modem can facilitate identification of authorized UEs within the femtocell coverage area and accordingly the FAP can selectively activate/deactivate its cellular transmitter. Moreover, the Bluetooth range of the Bluetooth modem can be set to match (or be substantially similar to) the femtocell coverage area.

At 802, the cellular transmitter, for example, a UMTS transmitter, can be deactivated. Further, at 804, a Bluetooth transmitter, operatively connected to the FAP, can be activated. At 806, Bluetooth pairing can be initiated with a UE within the Bluetooth range (e.g., by the Bluetooth modem, or by a Bluetooth client in the UE). As noted above, since the Bluetooth range matches (or is substantially similar to) the femtocell coverage area, Bluetooth pairing can be performed with UEs within the femtocell coverage area. At 808, it can be determined whether Bluetooth pairing is successful. Moreover, UEs that are authorized for femtocell access are provided with information (e.g., a password) that facilitates successful Bluetooth pairing with the Bluetooth modem. As an example, when a UE is added to a whitelist of a FAP, a user can complete a Bluetooth registration (including password) from the UE towards the specific FAP Bluetooth modem. If Bluetooth pairing is not successful, the method continues back to 806, wherein Bluetooth pairing is initiated with a disparate UE (and cellular transmitter remains deactivated). Alternately, if Bluetooth pairing is successful, at 810, the cellular transmitter is activated. The UE can detect the femto pilot and at 812, attachment signaling can be performed to enable the UE to camp onto the femtocell.

In addition, once the cellular transmitter is activated, the Bluetooth modem can be employed facilitate authorization of new UEs, within the femtocell coverage area, prior to an attachment attempt made by the UE. For example, when a femtocell with LAC within a femto LAC range is detected by the UE, the UE can activate a Bluetooth receiver (e.g., within the UE) and scan for a registered Bluetooth transmitter, for example, based on the unique identifier of the FAP. If a registered Bluetooth transmitter not found, then, the UE does not attempt to attach and/or handover to the femtocell. Thus, unnecessary attachment signaling is reduced and UE battery life is extended. Moreover, only if Bluetooth pairing is successful, LAU/RAU is performed and the UE can attach to the femtocell.

Referring back to FIG. 8, at 814, it can be determined whether at least one authorized UE is present within the femtocell coverage area. If one or more authorized UEs are present within the femtocell coverage area, then at 816, the cellular transmitter is kept activated. Alternately, if authorized UEs have moved out of the femtocell coverage area, the method returns to 802 and the cellular transmitter is deactivated.

Figure 9:
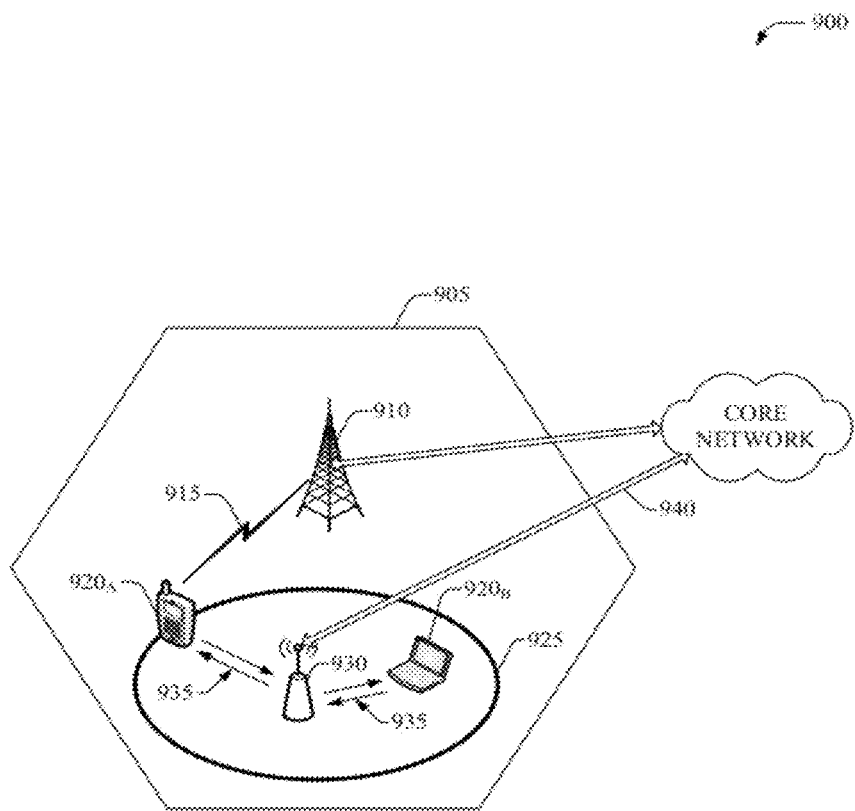
FIG. 9 illustrates an example wireless communication environment with associated components for operation of a femtocell in accordance with the subject specification.

FIG. 9 illustrates a schematic wireless environment 900 (e.g., a network) in which a femtocell can exploit various aspects of the subject innovation in accordance with the disclosed subject matter. In wireless environment 900, area 905 can represent a coverage macro cell, which can be served by base station 910. Macro coverage is generally intended for outdoors locations for servicing mobile wireless devices, like UE $920_A$, and such coverage is achieved via a wireless link 915. In an aspect, UE 920 can be a 3GPP Universal Mobile Telecommunication System (UMTS) mobile phone.

Within macro coverage cell 905, a femtocell 925, served by a femto access point 930, can be deployed. A femtocell typically can cover an area 925 that is determined, at least in part, by transmission power allocated to FAP 930, path loss, shadowing, and so forth. Coverage area typically can be spanned by a coverage radius that ranges from 20 to 50 meters. Confined coverage area 925 is generally associated with an indoors area, or a building, which can span about 5000 sq. ft. Generally, FAP 930 typically can service a number (e.g., a few or more) wireless devices (e.g., subscriber station $920_B$) within confined coverage area 925. In an aspect, FAP 930 can integrate seamlessly with substantially any PS-based and CS-based network; for instance, FAP 930 can integrate into an existing 3GPP Core via conventional interfaces like Iu-CS, Iu-PS, Gi, Gn. In another aspect, FAP 930 can exploit high-speed downlink packet access in order to accomplish substantive bitrates. In yet another aspect, FAP 930 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE $920_A$, leaves macro coverage (e.g., cell 905) and enters femto coverage (e.g., area 925), as illustrated in environment 900, a Bluetooth receiver in the subscriber station can detect signals broadcast by a Bluetooth modem within the FAP 930. Further, Bluetooth pairing can be performed between a Bluetooth client in the subscriber station and the Bluetooth modem of FAP 930. If Bluetooth pairing is successful, the FAP 930 can switch on its cellular transmitter and the UE $920_A$ can detect the FAP 930 during a carrier frequency scan. On detection, UE $920_A$ can attach to the FAP 930 through transmission and reception of attachment signaling effected via a FL/RL 935; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 920 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes FAP 930) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if Bluetooth pairing is not successful, the cellular transmitter of FAP 930 remains deactivated and the UE 920 does not detect the FAP 930. UE 920 generally can be commanded (through a variety of communication means) to select another LAC/RAC or enter "emergency calls only" mode. It is to be appreciated that this attempt and handling process can occupy significant UE battery, and FAP capacity and signaling resources as well.

When an attachment attempt is successful (e.g., after Bluetooth pairing), UE 920 can be allowed on femtocell 925, and incoming voice and data traffic can be paged and routed to the subscriber station through the FAP 930. It is to be noted also that data traffic is typically routed through a backhaul broadband wired network backbone 940 (e.g., optical fiber backbone, twisted-pair line, T1/E1 phone line, DSL, or coaxial cable). It is to be noted that as a FAP 930 generally can rely on a backhaul network backbone 940 for routing and paging, and for packet communication, substantially any quality of service can handle heterogeneous packetized traffic. Namely, packet flows established for wireless communication devices (e.g., terminals $920_A$ and $920_B$) served by FAP 930, and for devices served through the backhaul network pipe 940. It is to be noted that to ensure a positive subscriber experience, or perception, it is desirable for FAP 930 to maintain a high level of throughput for traffic (e.g., voice and data) utilized on a mobile device for one or more subscribers while in the presence of external, additional packetized, or broadband, traffic associated with applications (e.g., web browsing, data transfer (e.g., content upload), and the like) executed in devices within the femto coverage area (e.g., area 925).

Figure 10:
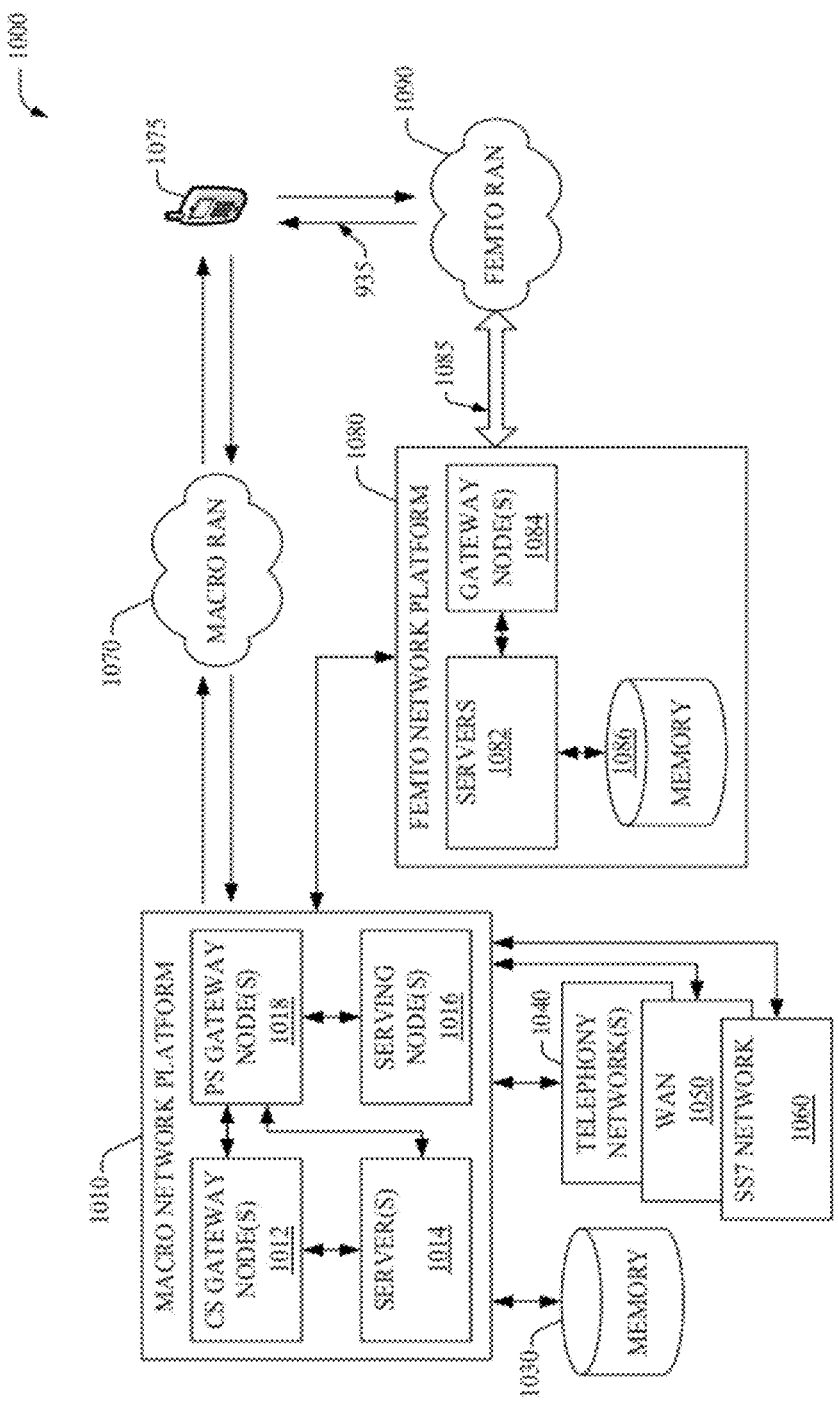
FIG. 10 illustrates a schematic deployment of a macro cell and a femtocell for wireless coverage in accordance with aspects of the disclosure.
Figure 11:
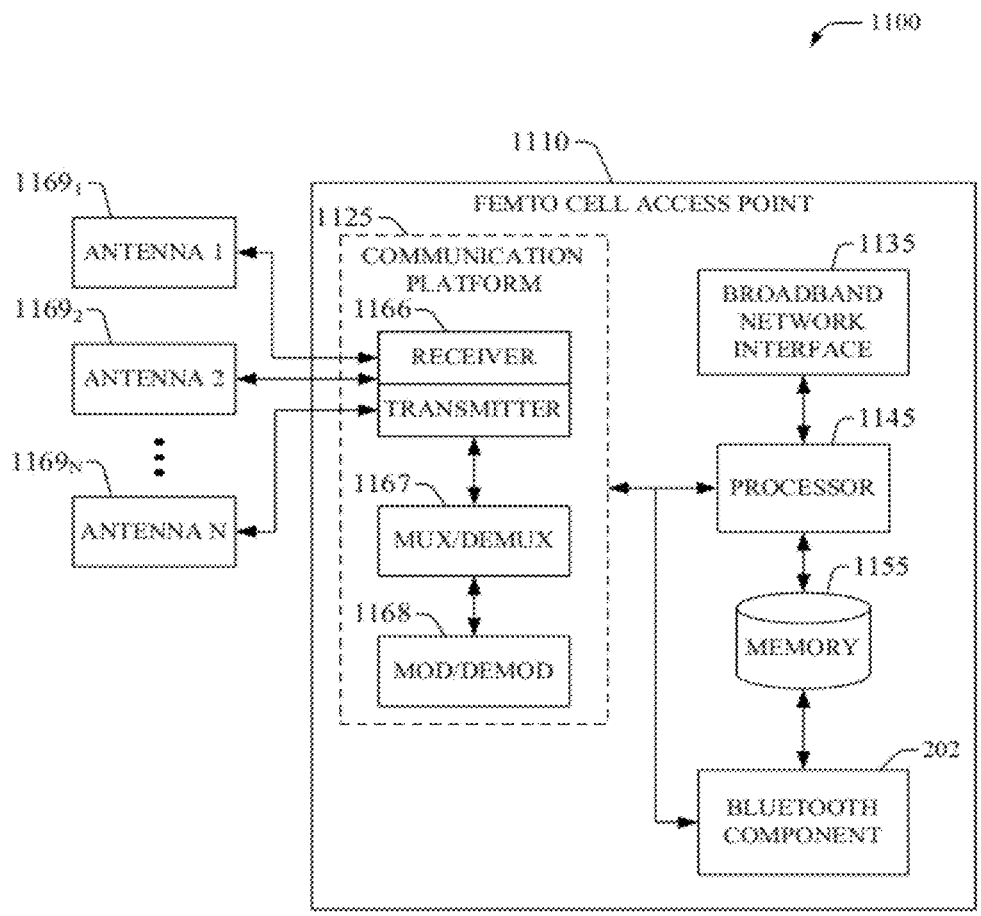
FIG. 11 illustrates an example embodiment of a femto access point that can facilitate Bluetooth-enabled pilot gating, according to the subject disclosure.

To provide further context for various aspects of the subject specification, FIGS. 10 and 11 illustrate, respectively, an example wireless communication environment 1000, with associated components for operation of a femtocell, and a block diagram of an example embodiment 1100 of a femto access point, which can facilitate Bluetooth-enabled femto pilot gating in accordance with aspects described herein.

Wireless communication environment 1000 includes two wireless network platforms: (i) A macro network platform 1010 that serves, or facilitates communication) with user equipment 1075 via a macro radio access network (RAN) 1070. It should be appreciated that in cellular wireless technologies (e.g., 3GPP UMTS, HSPA, 3GPP LTE, 3GPP UMB), macro network platform 1010 is embodied in a Core Network. (ii) A femto network platform 1080, which can provide communication with UE 1075 through a femto RAN 1090 linked to the femto network platform 1080 via backhaul pipe(s) 1085, wherein backhaul pipe(s) are substantially the same a backhaul link 940. It should be appreciated that femto network platform 1080 typically offloads UE 1075 from macro network, once UE 1075 attaches to femto RAN.

It is noted that RAN includes base station(s), or access point(s), and its associated electronic circuitry and deployment site(s), in addition to a wireless radio link operated in accordance with the base station(s). Accordingly, macro RAN 1070 can comprise various coverage cells like cell 1005, while femto RAN 1090 can comprise multiple femtocell access points. According to an aspect, the femtocell access points can be operatively coupled to Bluetooth modems to facilitate Bluetooth pairing with UEs. As mentioned above, it is to be appreciated that deployment density in femto RAN 1090 is substantially higher than in macro RAN 1070.

Generally, both macro and femto network platforms 1010 and 1080 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 1010 includes CS gateway node(s) 1012 which can interface CS traffic received from legacy networks like telephony network(s) 1040 (e.g., public switched telephone network (PSTN), or public land mobile network (PLMN)) or a SS7 network 1060. Moreover, CS gateway node(s) 1012 interfaces CS-based traffic and signaling and gateway node(s) 1018.

In addition to receiving and processing CS-switched traffic and signaling, gateway node(s) 1018 can authorize and authenticate PS-based data sessions with served (e.g., through macro RAN) wireless devices. Data sessions can include traffic exchange with networks external to the macro network platform 1010, like wide area network(s) (WANs) 1050; it should be appreciated that local area network(s) (LANs) can also be interfaced with macro network platform 1010 through gateway node(s) 1018. Gateway node(s) 1018 generates packet data contexts when a data session is established. It should be further appreciated that the packetized communication can include multiple flows that can be generated through server(s) 1014. Macro network platform 1010 also includes serving node(s) 1016 that convey the various packetized flows of information, or data streams, received through gateway node(s) 1018. It is to be noted that server(s) 1014 can include one or more processor configured to confer at least in part the functionality of macro network platform 1010. To that end, the one or more processor can execute code instructions stored in memory 1030, for example.

In example wireless environment 1000, memory 1030 stores information related to operation of macro network platform 1010. Information can include business data associated with subscribers; market plans and strategies, e.g., promotional campaigns, business partnerships; operational data for mobile devices served through macro network platform; service and privacy policies; end-user service logs for law enforcement; and so forth. Memory 1030 can also store information from at least one of telephony network(s) 1040, WAN(s) 1050, or SS7 network 1060.

Femto gateway node(s) 1084 have substantially the same functionality as PS gateway node(s) 1018. Additionally, femto gateway node(s) 1084 can also include substantially all functionality of serving node(s) 1016. In an aspect, femto gateway node(s) 1084 facilitates handover resolution, e.g., assessment and execution. Server(s) 1082 have substantially the same functionality as described in connection with server(s) 1014 and can include one or more processor configured to confer at least in part the functionality of macro network platform 1010. To that end, the one or more processor can execute code instructions stored in memory 1086, for example.

Memory 1086 can include information relevant to operation of the various components of femto network platform 1080. For example operational information that can be stored in memory 1086 can comprise, but is not limited to, subscriber information; contracted services; maintenance and service records; femtocell configuration (e.g., devices served through femto RAN 1090; access control lists, or white lists); service policies and specifications; privacy policies; add-on features; and so forth.

With respect to FIG. 11, in example embodiment 1100, femtocell AP 1110 can receive and transmit signal(s) (e.g., traffic and control signals) from and to wireless devices, access terminals, wireless ports and routers, etc., through a set of antennas $1169_1$-$1169_N$. It should be appreciated that while antennas $1169_1$-$1169_N$ are a part of communication platform 1125, which is substantially similar to communication component 210 and can include functionality, as more fully described herein with respect to communication component 210, in systems 200, 300, 400, 500 and 600. The communication platform 1125 comprises electronic components and associated circuitry that provides for processing and manipulating of received signal(s) (e.g., a packet flow) and signal(s) (e.g., a broadcast control channel) to be transmitted. In an aspect, communication platform 1125 includes a transmitter/receiver (e.g., a transceiver) 1166 that can convert signal(s) from analog format to digital format upon reception, and from digital format to analog format upon transmission. In addition, receiver/transmitter 1166 can divide a single data stream into multiple, parallel data streams, or perform the reciprocal operation. According to an aspect, the communication platform 1125 can control the duty cycle of the receiver/transmitter 1166 based on the presence and/or proximity of authorized UEs in the femtocell coverage area. Coupled to transceiver 1166 is a multiplexer/demultiplexer 1167 that facilitates manipulation of signal in time and frequency space. Electronic component 1167 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1167 can scramble and spread information (e.g., codes) according to substantially any code known in the art; e.g., Hadamard-Walsh codes, Baker codes, Kasami codes, polyphase codes, and so on. A modulator/demodulator 1168 is also a part of operational group 1125, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 1110 also includes a processor 1145 configured to confer functionality, at least partially, to substantially any electronic component in the femto access point 1110, in accordance with aspects of the subject innovation. In particular, processor 1145 can facilitate FAP 1110 to implement configuration instructions received through communication platform 1125, which can include storing data in memory 1155. In addition, processor 1145 facilitates FAP 1110 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1145 can manipulate antennas 1169$_1$-1169$_N$ to facilitate beamforming or selective radiation pattern formation, which can benefit specific locations (e.g., basement, home office . . . ) covered by FAP; and exploit substantially any other advantages associated with smart-antenna technology. Memory 1155 can store access control lists, data structures, code instructions, system or device information like device identification codes (e.g., IMEI, MSISDN, serial number . . . ) and specification such as multimode capabilities; code sequences for scrambling; spreading and pilot transmission, floor plan configuration, access point deployment and frequency plans; and so on. Moreover, memory 1155 can store configuration information such as schedules and policies; FAP address(es) or geographical indicator(s); access control lists (e.g., white lists); license(s) for utilization of add-features for FAP 1110, and so forth.

In embodiment 1100, processor 1145 is coupled to the memory 1155 in order to store and retrieve information necessary to operate and/or confer functionality to communication platform 1125, broadband network interface 1135 (e.g., a broadband modem), and other operational components (e.g., multimode chipset(s), power supply sources . . . ; not shown) that support femto access point 1110. The FAP 1110 can further include (or be operatively coupled to) a Bluetooth component 202, which can include functionality, as more fully described herein, for example, with regard to systems 200, 300, 400, 500, and 600. In addition, it is to be noted that the various aspects disclosed in the subject specification can also be implemented through (i) program modules stored in a computer-readable storage medium or memory (e.g., memory 1086 or memory 1155) and executed by a processor (e.g., processor 1145), or (ii) other combination(s) of hardware and software, or hardware and firmware.

Figure 12:
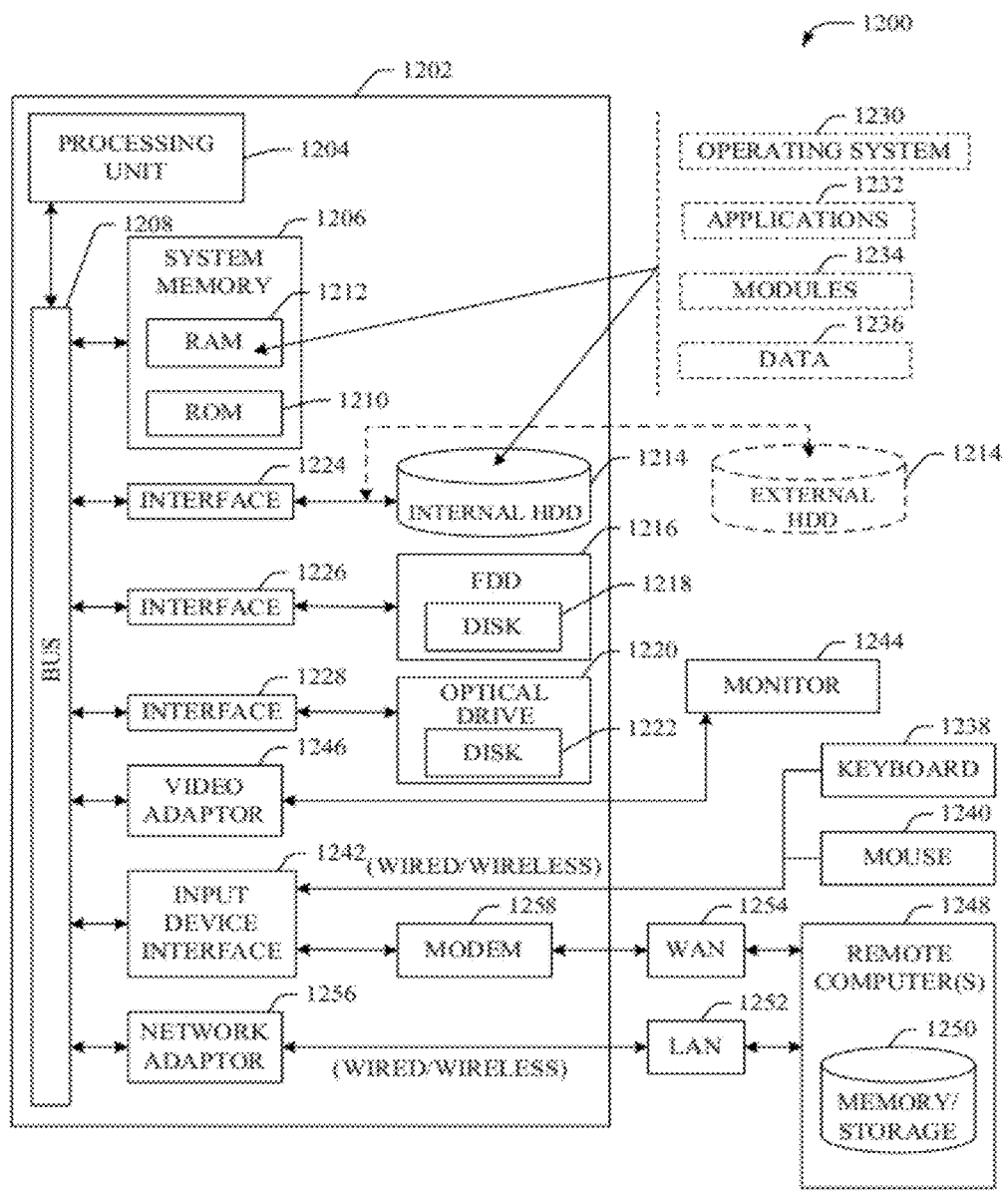
FIG. 12 illustrates a block diagram of a computer operable to execute the disclosed communication architecture.

Referring now to FIG. 12, there is illustrated a block diagram of a computer operable to execute the disclosed communication architecture. In order to provide additional context for various aspects of the subject specification, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) can include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A femto access point device, comprising:
   a memory to store instructions; and
   a processor, coupled to the memory, that facilitates execution of the instructions to perform operations, comprising:
      in response to determining that identifier data associated with a user equipment is represented in an access control data structure that is employed to manage access to the femto access point device, facilitating a transmission of credential data to the user equipment, wherein the credential data facilitates a pairing between the user equipment and a Bluetooth modem within the femto access point device, and
      subsequent to the user equipment entering a coverage area associated with the femto access point device and in response to determining, based on the pairing, that the user equipment is authorized to access the femto access point device, activating a cellular network transmitter of the femto access point device to facilitate a detection of the femto access point device by the user equipment.

2. The femto access point device of claim 1, wherein the operations further comprise:
   deactivating the cellular network transmitter in response to determining that the user equipment has exited the coverage area.

3. The femto access point device of claim 2, wherein the user equipment is an authorized user equipment, the pairing is a first pairing, and the operations further comprise:
   initiating a second pairing between the Bluetooth modem and an unauthorized user equipment within the coverage area, wherein the unauthorized user equipment is not represented in the access control data structure, and
   in response to determining, based on the second pairing, that the unauthorized user equipment is not authorized to establish the second pairing, prohibiting an activation of the cellular network transmitter.

4. The femto access point device of claim 1, wherein the transmission is a first transmission and the operations further comprise:
   in response to the activating, facilitating, via the cellular network transmitter, a second transmission of location area code data to facilitate detection of the femto access point by the user equipment.

5. The femto access point device of claim 1, wherein the user equipment is a first authorized user equipment, the pairing is a first pairing, and the operations further comprise:
   subsequent to the activating, initiating a second pairing between the Bluetooth modem and a second authorized user equipment that is within the coverage area, and
   prior to performing attachment signaling between the femto access pint device and the second authorized user equipment, verifying that the second authorized user equipment is authorized to access the femto access point device based on the second pairing, wherein the attachment signaling is performed based on the verifying.

6. The femto access point device of claim 2, wherein the operations further comprise:
   subsequent to the deactivating, facilitating a network listen scan to determine measurement data, and
   based on the measurement data, adjusting a transmission power of the Bluetooth modem.

7. The femto access point device of claim 2, wherein the operations further comprise:
   in response to the deactivating, facilitating a jamming of a macro pilot signal transmitted by a macro base station device that serves a communication device, wherein the jamming comprises facilitating a transmission of an interference signal that degrades a signal quality associated with the macro pilot signal to trigger a frequency scan by the communication device.

8. The femto access point device of claim 6, wherein the coverage area is a first coverage area and the adjusting comprises adjusting the transmission power to match a second coverage area associated with the Bluetooth modem with the first coverage area.

9. A method, comprising:
   determining, by a femto access point device comprising a processor, that identifier data associated with a user equipment is represented within an access control data structure that manages access to the femto access point device;
   in response to the determining, directing, by the femto access point device, credential data to the user equipment, wherein the credential data is employed to facilitate a pairing between the user equipment and a Bluetooth modem within the femto access point device; and
   subsequent to the user equipment entering a coverage area associated with the femto access point device and in response to determining that the user equipment has paired with the Bluetooth modem, activating, by the femto access point device, a cellular transmitter of the femto access point device to facilitate a detection of the femto access point device by the user equipment.

10. The method of claim 9, further comprising:
    deactivating, by the femto access point device, the cellular transmitter in response to determining that the user equipment has exited the coverage area.

11. The method of claim 10, wherein the user equipment is a first user equipment, the pairing is a first pairing, and the method further comprises:
    subsequent to the deactivating and in response to determining that a second user equipment is within the coverage area, initiating, by the femto access point device, a second pairing between the Bluetooth modem and the second user equipment; and in response to determining that the second user equipment is not authorized to establish the second pairing, prohibiting, by the femto access point device, an activation of the cellular transmitter.

12. The method of claim 9, further comprising, wherein the directing comprises directing, to the user equipment, information indicative of a location of the femto access point device.

13. The method of claim 9, wherein the directing comprises directing, to the user equipment, information indicative of a passkey employed to facilitate the pairing.

14. The method of claim 10, further comprising:

subsequent to the deactivating, determining, by the femto access point device, measurement data based on a network listen scan.

15. The method of claim 14, further comprising:

based on the measurement data, facilitating, by the femto access point device, a modification of a transmission power of the Bluetooth modem.

16. The method of claim 14, further comprising:

based on the measurement data, determining, by the femto access point device, a modification of a transmission power of the cellular transmitter.

17. The method of claim 9, wherein the activating comprises increasing a transmission power of the cellular transmitter over a defined time interval.

18. A non-transitory computer readable storage device comprising instructions that, in response to execution, cause a femto access point device comprising a processor to perform operation, comprising:

in response to receiving identifier data indicative of a user equipment that is to be added to an access control data structure that manages access to the femto access point device, directing credential data to the user equipment, wherein the credential data is employed to facilitate a pairing between the user equipment and a Bluetooth modem of the femto access point device; and subsequent to the user equipment entering a coverage area associated with the femto access point device and in response to determining, based on the pairing, that the user equipment is authorized to access the femto access point device, activating a cellular transmitter of the femto access point device to facilitate a detection of the femto access point device by the user equipment.

19. The non-transitory computer readable storage device of claim 18, wherein the credential data comprises information indicative of a passkey that authorizes the pairing.

20. The non-transitory computer readable storage device of claim 19, wherein the credential data comprises information indicative of a location of the femto access point device.

* * * * *